Feb. 7, 1950     L. DE FLOREZ     2,496,274
AIRCRAFT INSTRUMENT

Filed April 18, 1945     5 Sheets-Sheet 1

*INVENTOR.*
LUIS DE FLOREZ
BY
Ralph L. Chappell
*ATTORNEY.*

Feb. 7, 1950 L. DE FLOREZ 2,496,274
AIRCRAFT INSTRUMENT
Filed April 18, 1945 5 Sheets-Sheet 3

INVENTOR.
LUIS DE FLOREZ
BY
Ralph W Chappell
ATTORNEY.

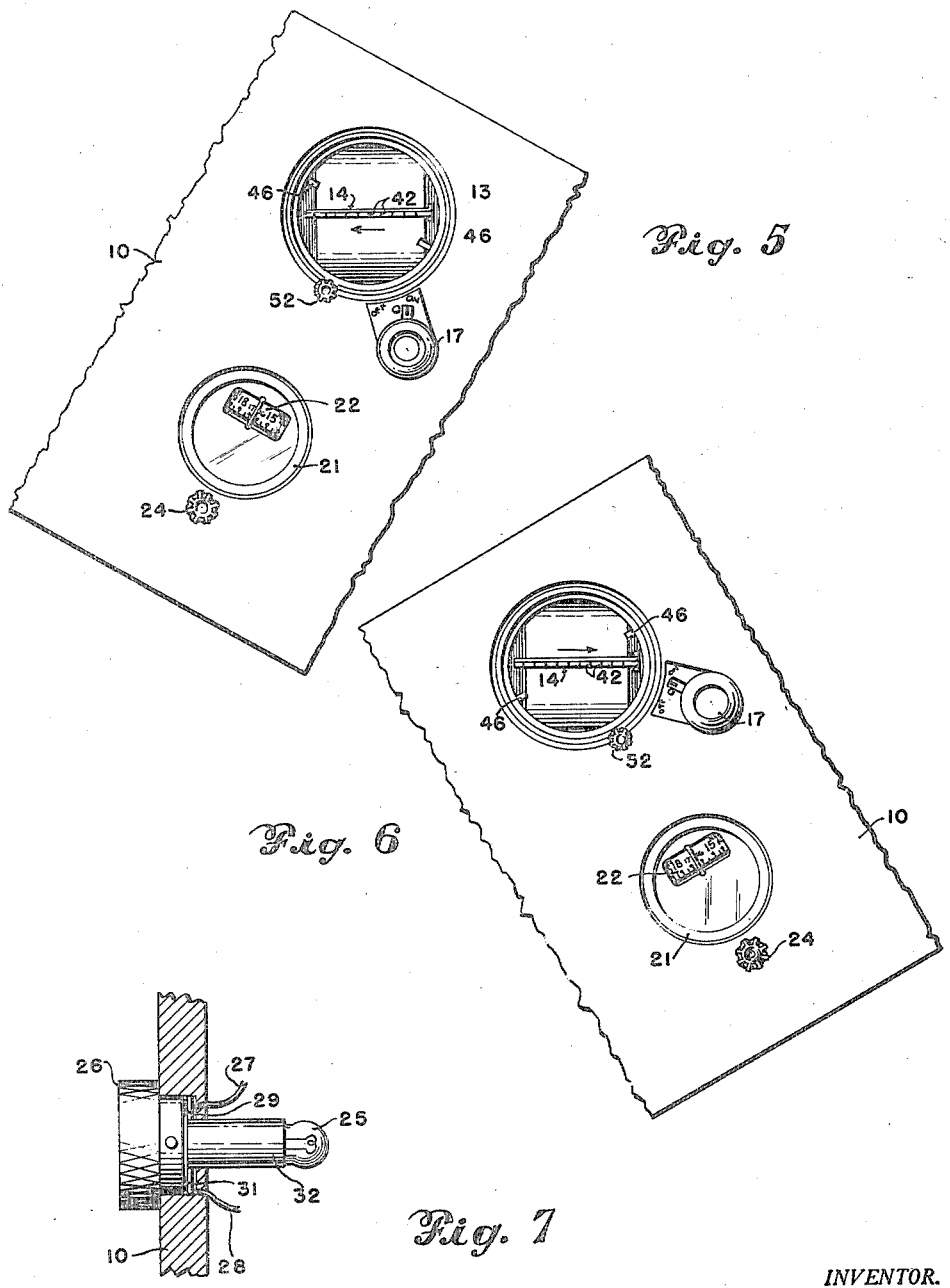

Feb. 7, 1950      L. DE FLOREZ      2,496,274
AIRCRAFT INSTRUMENT

Filed April 18, 1945      5 Sheets-Sheet 5

*INVENTOR.*
LUIS DE FLOREZ
BY
Ralph L. Chappell
ATTORNEY.

Patented Feb. 7, 1950

2,496,274

UNITED STATES PATENT OFFICE 2,496,274

AIRCRAFT INSTRUMENT

Luis de Florez, United States Navy

Application April 18, 1945, Serial No. 589,004

6 Claims. (Cl. 33—204)

(Granted under the act of March 3, 1883, as amended April 30, 1928; 370 O. G. 757)

The present invention relates to aircraft instruments. It is the general aim of the invention to simplify instrument flight and provide for easier and safer flight under instrument conditions.

This aim is accomplished by the provision of a novel and improved three dimensional flight instrument, in which a single indicator gives the pilot complete information as to bank, dive and climb, and turn. That is, the instrument not only shows the angles of dive, climb and bank, but also shows the direction and rate of turning movements.

In this respect, it affords a true simulation of the actual horizon, since the real horizon, unlike conventional horizon instruments, gives a true three-dimensional reference.

It is well known that when the pilot can see the actual horizon it requires no more than a glance for him to determine his attitude in all three planes of space. That is, the angle between the horizon and the wing tips of the plane indicates the direction and the amount of bank, while the angle between the horizon and the flight path of the plane shows whether the plane is climbing, diving, or flying level. Moreover, the actual horizon gives an indication of the rate and direction of any turning movement of the aircraft, since the horizon invariably includes landmarks such as buildings, lights, or plumes of smoke, and any turning movement of the aircraft will result in an apparent sidewise motion of all these landmarks along the horizon. As an example, assuming that a plane is flying a level course and maintaining the wing tips level. The horizon will appear stationary if the course of the plane is exactly straight. However, if the plane is turning to the right, for example, any landmarks on the horizon will appear to be drifting from right to left across the horizon. The rate of speed of their apparent movement will be dependent on the rate of turn of the airplane.

This phenomenon is so well known to pilots that they respond to it and correct the course of the plane without conscious effort. It is unnecessary for them to engage in a conscious mental evaluation of the optical picture of the horizon and to determine the direction and rate of turn consciously. Rather, they instinctively know the amount of turn and correct for it automatically.

From the foregoing, it will be seen that although the pilot of a plane in contact flight can determine his attitude in three dimensions by reference to the actual horizon, the aircraft instruments heretofore known and commonly used have been unable to accomplish the same effect. The standard type of gyro-horizon commonly used is capable of giving an indication of bank and of climb, but gives no indication of rate of direction of turn. Thus, it falls short of a true simulation of the actual horizon, and requires the pilot to divert his attention from observation of the horizon to a directional gyro or turn indicator, and then to mentally evaluate the combined readings of several instruments to determine the position of the aircraft.

One of the principal objects of the present invention is to provide a flight instrument including a synthetic horizon indication designed to give a more natural and realistic simulation of the actual horizon than instruments heretofore known, so that the instinctive reaction of a pilot to the appearance of the actual horizon will carry over and allow him to fly under instrument conditions with the same degree of naturalness as when the actual horizon is visible and available as a reference.

A further object of the invention resides in the provision of a three dimensional flight instrument including a horizon indicator and means for maintaining it in level horizontal position, together with means for causing landmark indications to move sidewise across the horizon in response to turning movements of the aircraft.

Referring now more particularly to the drawings attached to and forming a part of the present specification.

Figure 5 is a reduced scale face view of the instrument as it appears when the aircraft is in a banking turn to the right.

Figure 6 is a reduced scale face view of the instrument as it appears when the plane is executing a banking turn to the left.

Figure 7 is a detail sectional view taken substantially on the plane of the line 7—7 of Figure 1.

Figure 1:
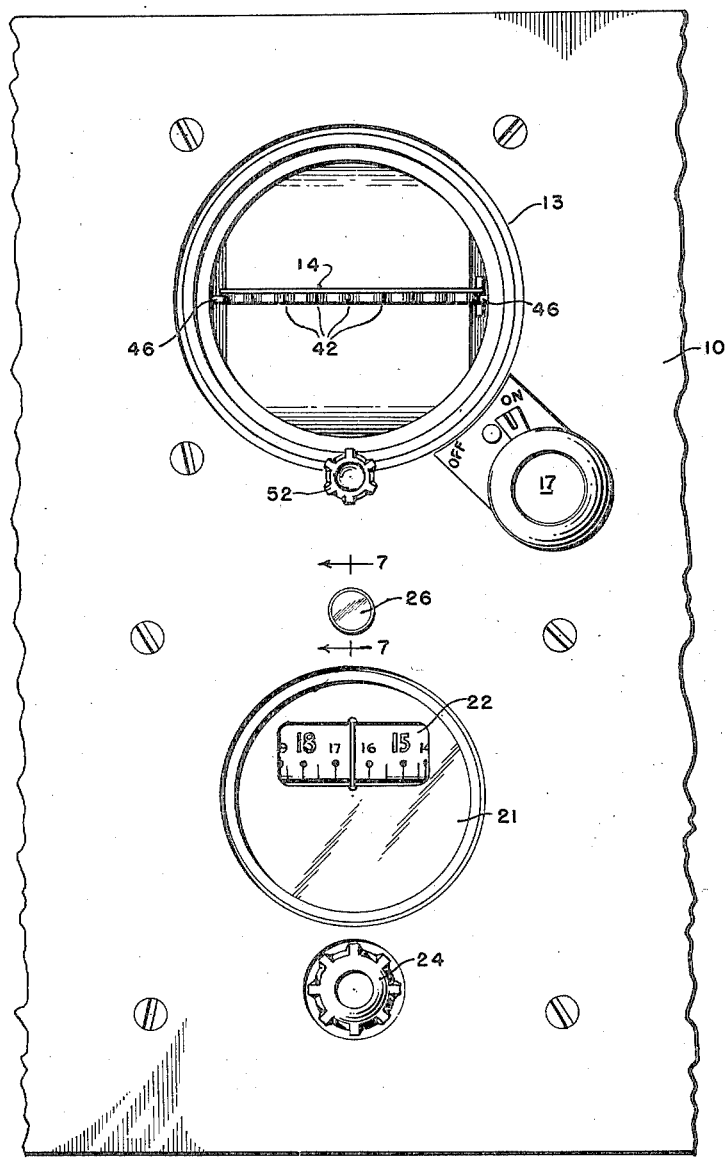
Figure 1 is a front elevational view of a simulated horizon as contemplated by this disclosure.
Figure 2:
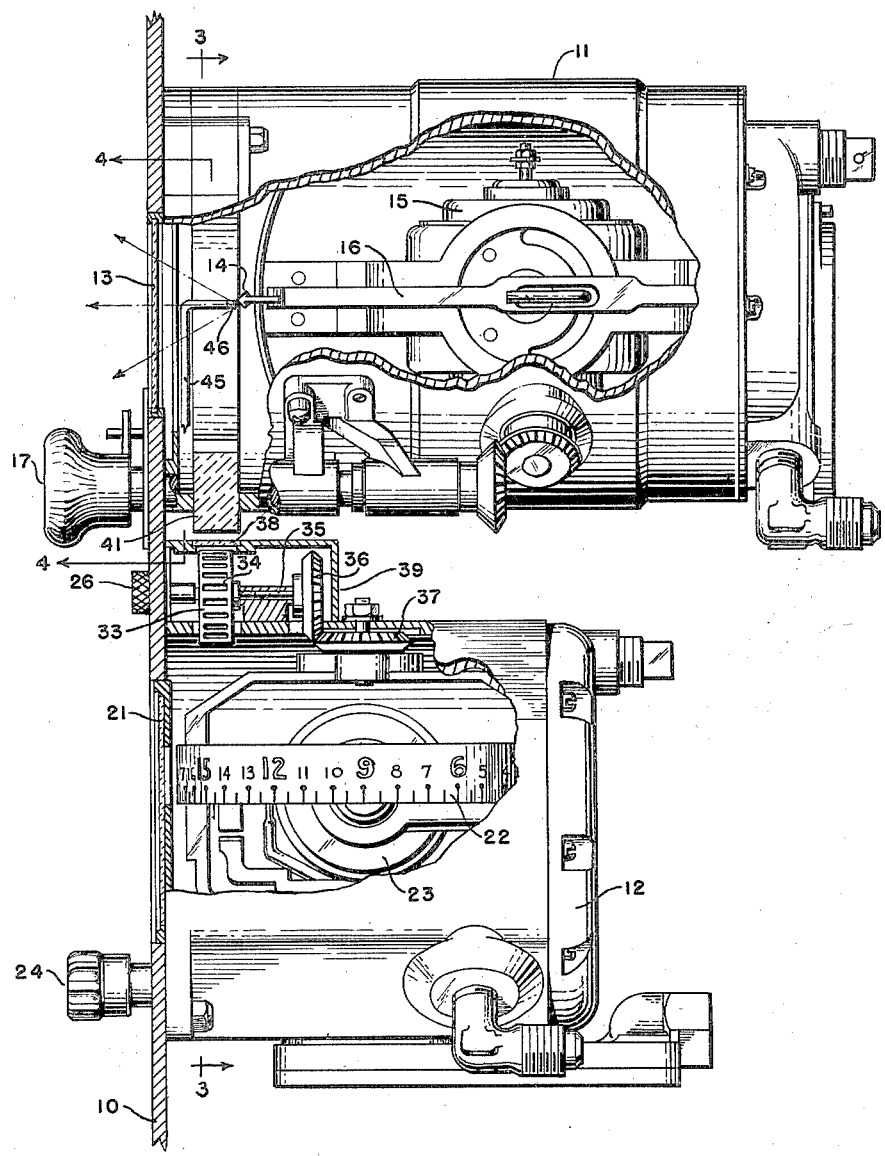
Figure 2 is a side elevational view of the instrument illustrated in Figure 1 with certain parts of the housing broken away to show the operating mechanism.

The instrument illustrated includes, in general, a gyro-horizon or attitude gyro, and a directional gyro mounted in close association with each other on the instrument panel 10. The attitude gyro is housed in a case 11 and includes a dial 13 and a horizon indicating bar 14 connected to a rotating gyroscope 15 by a mechanical linkage 16. Thus after the instrument is originally set and the cage knob 17 is turned to release the gyroscope mechanism, the operation of the gyroscope 15 will serve to maintain the horizon indicating bar 14 in horizontal position irrespective of normal banking, turning, or diving movements of the airplane.

The directional gyro is housed in a case 12 and includes a dial 21 and a compass card 22 positioned adjacent to the dial and controlled in its movement by a rotary gyroscope mechanism 23. The directional gyro also includes a caging knob 24 so that when the compass card has been properly set and the caging knob released, the directional gyroscope 23 will function to maintain the compass card 22 stationary, despite normal turns and maneuvers of the airplane. The directional gyro is utilized in combination with the gyro-horizon in a manner to be later described, but it may also be provided with a dial window so that the pilot may view the compass card in the conventional manner.

Since the operating mechanisms of conventional attitude gyros and directional gyros are well known in the field of aviation instruments, and since the mechanical details of these instruments form no part of the present invention except in combination with the features defined in the claims, the structural details of these instruments will not be more fully described in this disclosure.

It has been previously stated that one of the objects of the invention is to provide a horizon indicator wherein landmark indications are caused to move sidewise along the horizon in response to turning movements of the aircraft. These landmark indications may be moved along the horizon mechanically if desired, but to avoid mechanical friction insofar as possible, the present disclosure contemplates causing optical landmark indications to move along the horizon. This is done by providing an illuminated field associated with the directional gyro 12, so that whenever the plane turns to right or left, the illuminated field will shift in the opposite direction and cause apparent longitudinal motion of the landmark indications along the horizon bar 14. Thus, a turn to the right results in an apparent drift of all horizon landmarks from right to left, while a turn to the left results in an apparent drift of the landmarks from left to right. Obviously, the landmarks may be caused to shift in either direction but the direction of movement indicated gives an accurate simulation of the apparent sidewise movement of real landmarks as observed along the actual horizon in front of a plane when a turn is being executed.

To this end, a light source such as the incandescent lamp 25 is mounted in a removable plug socket 26 positioned in the panel 10 between the attitude gyro dial 13 and the directional gyro dial 21. Electrical connections to the incandescent lamp are established through a pair of leads 27 and 28, which establish contact with separable connectors 29 and 31 in the plug socket 26. The incandescent lamp 25 is carried by a tubular socket extension 32 so that it will extend into an optical screen formed in the shape of a small rotary drum 33 having slots 34 in its outer surface to provide a series of alternate opaque and transparent portions. The drum 33 is rotatably mounted on a shaft 35 and is driven by a bevel gear 36 which meshes with a matching bevel gear 37 secured to the vertical spindle of the directional gyroscope 23. The arrangement is such that when the airplane makes a turn to the right or left, the relative movement of the casing 12 of the directional gyro around the compass card 22 and gyroscope 23, which maintains a fixed position in space, will cause the bevel gear 36 to rotate and move the individual slots 34 of the drum in a progression across the window 38 in the cover box 39 surrounding the drum.

Figure 3:
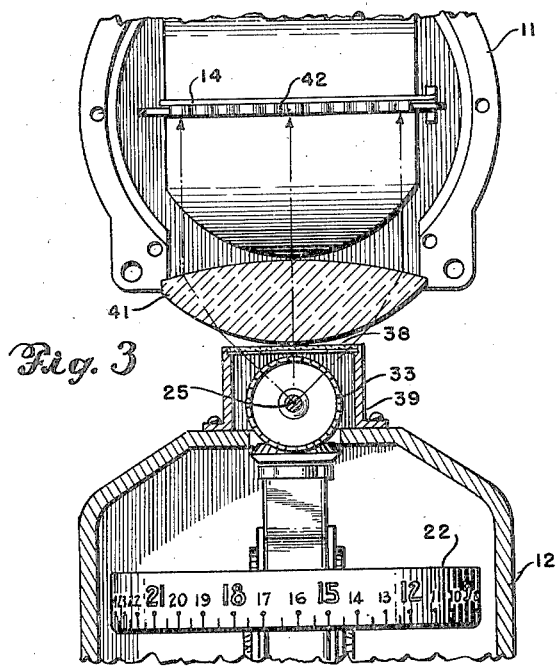
Figure 3 is a fragmental detail sectional view taken substantially on the plane of the line 3—3 in Figure 2.
Figure 4:
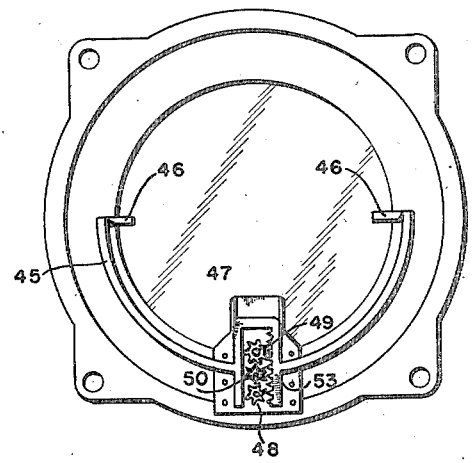
Figure 4 is a detail sectional view taken substantially on the plane of the line 4—4 of Figure 2.

The light from the incandescent lamp 25 passes through the individual slots 34 of the drum 33 to form a plurality of divergent light beams which pass upwardly through the window 38 to a condensing lens 41 mounted in the housing of the attitude gyro 15. The lens 41 refracts these light rays somewhat as indicated in Figure 3, so as to form an illuminated field consisting of a multiplicity of generally parallel rays, and to project the field upwardly toward the horizon bar 14. As illustrated, the horizon bar 14 is square in cross-section and is set at an angle to provide an angular reflecting surface to pick up light rays from the illuminated field and reflect them out through the dial window of the instrument. If desired, the horizon bar 14 may be provided with any type of high reflection coating. In any event, the individual light beams of the illuminated field will form light and dark areas 42 on the horizon bar 14. These areas may be referred to as landmark indications, since they move in a sidewise direction across the horizon when the aircraft is in a turn and thus substantially duplicate the apparent movement of landmarks on the actual horizon.

It should be particularly noted that the apparent direction of movement of these landmark indications is directly along the line of the horizon, irrespective whether the airplane is flying level as illustrated in Figure 1 or whether it is banking to the right or left as indicated in Figures 5 and 6 respectively.

It will be apparent that the angle of bank will be indicated by the angle existing between the fixtures of the aircraft and horizon indicating bar while any turn to right or left will be indicated by movement of the landmark indications along the bar 14. The angle of dive or climb of the aircraft is also indicated by the relative position of the horizon bar with respect to the dial and accurate observation of the angle of dive or climb is facilitated by the provision of a reference marking which is shown in the structure illustrated as comprising a semi-circular yoke 45 having a pair of oppositely disposed tabs 46 extending into the field of vision of the dial 13, so that the position of the tabs 46 may be compared with the gyroscopically controlled horizon bar to give a visual indication of the angle of dive or climb. However, in view of the fact that the apparent angle of climb or dive is dependent on the angle of attack of the aircraft as well as on its course of flight, means are provided for raising or lowering the tabs 46 to trim the instrument to give a true reading. For this purpose, the yoke 45 is mounted on a vertical guide 47 so that it may be moved upwardly or downwardly by the gear pinions 48, 49, and 50, arranged to transmit motion from the trim knob 52 to the rack 53 carried on the slide of the yoke 45.

Figure 8:
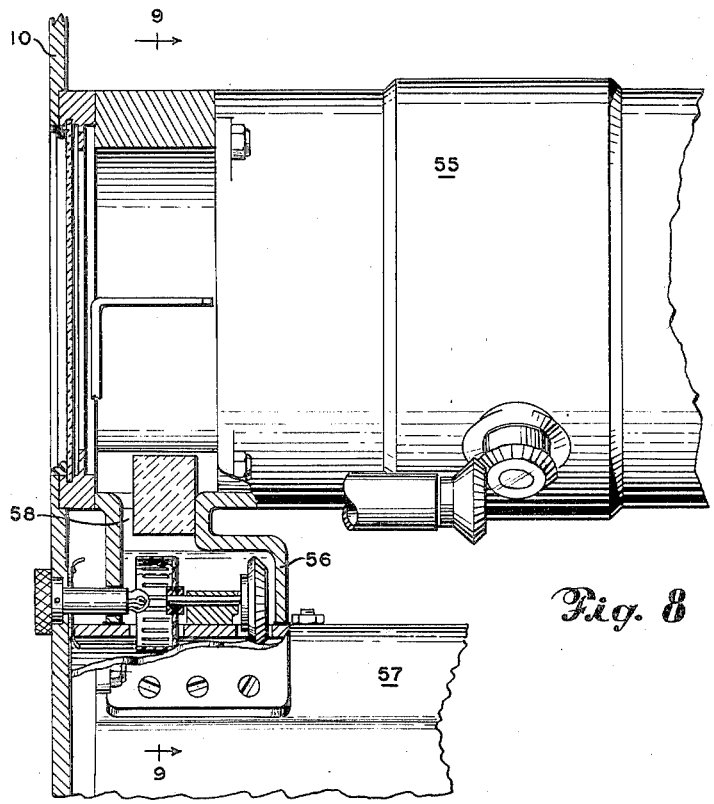
Figure 8 is a fragmental side elevational view, partly in section, showing a modified form of the invention.
Figure 9:
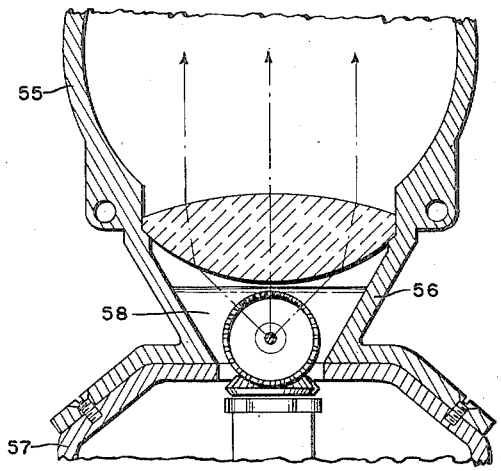
Figure 9 is a fragmental detail sectional view taken substantially on the plane of the line 9—9 of Figure 8.

The form of the invention illustrated in Figures 8 and 9 is identical with the form just described, except that the housing of the attitude gyro 55 is formed to include a hollow bracket 56, which interconnects the housing 55 with the housing of the directional gyro 57 to provide an air passage 58 between the two instrument housings.

From the foregoing, it will be apparent that by practicing the teachings of the present invention it is possible to provide a synthetic horizon instrument wherein the horizon is simulated in a much more realistic and natural manner than with any previously known instrument. It follows that when flying with the benefit of the improved artificial horizon a pilot will respond to it in a much more natural and effortless manner than with prior devices, with the result that instrument flight may be accomplished much more safely and with greater ease than heretofore.

While only two modifications of the structure of the device have been shown, it should be realized that it is subject to numerous other modifications and variations within the scope of the appended claims.

The invention described herein, if patented, may be manufactured and used by or for the Government for governmental purposes without the payment to me of any royalty thereon.

Having thus described the invention, what is claimed as new is:

1. In an aircraft instrument, the combination of a dial; a horizon indicator consisting of a long narrow bar extending substantially across the dial; means for maintaining the horizon indicator in level, horizontal position; said means including an attitude gyroscope and a mechanical linkage between the gyroscope and horizon bar; together with means responsive to turning movements of the aircraft for effecting apparent longitudinal movement of the horizon indicator; said last named means including a light source, a lens associated with said light source to focus its rays into a wide illuminated field of generally parallel rays; an optical screen includling alternate transparent and opaque portions, and a turn indicating gyroscope responsive to turning movements of the aircraft for moving the screen to cause lateral movement of the illuminated field; the turn indicating gyroscope being separate from and independent of the attitude gyroscope.

2. In an aircraft instrument, the combination of a horizon indicator of generally linear form; means for maintaining the horizon indicator in level, horizontal position, said means including a gyroscope; and turn indicating means for effecting apparent longitudinal movement of the horizon indicator; said turn indicating means including a light source, a slotted rotary optical screen to pass interrupted light rays from said source to the horizon indicator and a turn indicating gyroscope responsive to turning movements of the aircraft for rotating the screen.

3. In an aircraft instrument, the combination of an artificial horizon; optical instrumentalities comprising a light source and a slotted screen for causing light bands to move along said artificial horizon, and means responsive to turning movements of the aircraft to control the speed and direction of movement of said light bands.

4. In an aircraft instrument, the combination of a mechanically controlled artificial horizon consisting of a long narrow bar; optical instrumentalities comprising a light source and a rotary screen for causing light bands to move along said bar, and mechanical instrumentalities responsive to turning movements of the aircraft to control the speed and direction of movement of said light bands.

5. In an aircraft instrument, the combination of a dial, an artificial horizon having at least one reflecting surface, a light source, means for projecting light rays from the source to said horizon from whence they are reflected to the dial, gyro means responsive to movement of the aircraft about its longitudinal axis for effecting a corresponding rotary movement of said horizon with respect to the dial, said gyro means being responsive to movement of the aircraft about its horizontal transverse axis to effect a vertical movement of the horizon with respect to the dial, means for interrupting the light rays, to produce a series of light and dark areas on the dial alongside of said horizon, and a gyroscope for actuating said interrupting means to simulate a moving landscape when the aircraft turns, all three conditions of the actual horizon being thus indicated upon the dial.

6. In an aircraft instrument, in combination, a pair of gyroscopes, an artificial horizon connected to one of the gyroscopes, a light source mounted between the gyroscopes, means for projecting the light rays from the source to the artificial horizon, and means actuated by the other gyroscope for interrupting the light rays at spaced intervals to produce a series of light and dark areas upon the horizon.

LUIS DE FLOREZ.

REFERENCES CITED

The following references are of record in the file of this patent:

UNITED STATES PATENTS

| Number | Name | Date |
| --- | --- | --- |
| 2,043,168 | Havill | June 2, 1936 |
| 2,080,490 | Kollsman | May 18, 1937 |
| 2,134,932 | Smith | Nov. 1, 1938 |
| 2,292,732 | Anscott | Aug. 11, 1942 |
| 2,367,667 | Carter | Jan. 23, 1945 |